US010218260B1

(12) United States Patent
Jang et al.

(10) Patent No.: US 10,218,260 B1
(45) Date of Patent: Feb. 26, 2019

(54) DC-DC CONVERTER WITH SNUBBER CIRCUIT

(71) Applicants: Hyundai Motor Company, Seoul (KR); Kia Motors Corp., Seoul (KR)

(72) Inventors: Hui Sung Jang, Suwon-si (KR); Gi Bong Son, Hwaseong-si (KR); Hyun Wook Seong, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 16 days.

(21) Appl. No.: 15/832,584

(22) Filed: Dec. 5, 2017

(30) Foreign Application Priority Data

Oct. 18, 2017 (KR) .................. 10-2017-0135088

(51) Int. Cl.
| | |
|---|---|
| *H02M 1/42* | (2007.01) |
| *H02M 3/155* | (2006.01) |
| *H02M 1/34* | (2007.01) |
| *H02M 3/335* | (2006.01) |
| *H02M 1/14* | (2006.01) |
| *H02M 1/00* | (2006.01) |
| *H02M 1/44* | (2007.01) |

(Continued)

(52) U.S. Cl.
CPC .......... *H02M 1/34* (2013.01); *H02M 3/33569* (2013.01); *H02M 1/14* (2013.01); *H02M 1/42* (2013.01); *H02M 1/44* (2013.01); *H02M 3/155* (2013.01); *H02M 3/22* (2013.01); *H02M 3/28* (2013.01); *H02M 2001/0009* (2013.01); *H02M 2001/342* (2013.01); *H02M 2001/346* (2013.01)

(58) Field of Classification Search
CPC .......... H02M 3/22; H02M 3/28; H02M 3/325; H02M 2001/346; H02M 1/34; H02M 2001/348; H02M 3/155
USPC .............. 363/15, 16, 17, 56.12; 323/207
See application file for complete search history.

(56) References Cited

U.S. PATENT DOCUMENTS

| | | | | |
|---|---|---|---|---|
| 5,886,884 | A * | 3/1999 | Baek .................. | H02M 1/14 363/17 |
| 7,479,774 | B2 * | 1/2009 | Wai .................. | H02J 3/383 323/222 |

(Continued)

FOREIGN PATENT DOCUMENTS

JP        1295675 A * 11/1989 .............. H02M 3/28

*Primary Examiner* — Alex Torres-Rivera
(74) *Attorney, Agent, or Firm* — Morgan, Lewis & Bockius LLP (57) ABSTRACT

A DC-DC converter may include an inductor having one end connected to an input terminal and the other end connected to an output terminal; a switching circuit configured to determine whether or not power is to be applied from the input terminal to the inductor; a snubber circuit configured to be connected to both ends of the inductor and to the output terminal; an output current controller configured to derive an inductor current command value, which is the magnitude of a current flowing through the inductor, to allow an output current detection value obtained by detecting a current supplied to the output terminal to follow a predetermined output current command value; and an inductor current controller configured to determine the switching duty of the switching circuit to allow an inductor current detection value, obtained by detecting the current flowing through the inductor, to follow the inductor current command value.

20 Claims, 5 Drawing Sheets

(51) Int. Cl.
*H02M 3/22* (2006.01)
*H02M 3/28* (2006.01)

(56) References Cited

U.S. PATENT DOCUMENTS

| | | | | |
|---|---|---|---|---|
| 2012/0224396 A1* | 9/2012 | Nozaki | ............... | H02M 3/3378 363/17 |
| 2012/0249059 A1* | 10/2012 | Matsumae | ............ | H02M 3/337 320/107 |
| 2012/0300501 A1* | 11/2012 | Kojima | ............ | H02M 3/33576 363/17 |
| 2014/0226369 A1* | 8/2014 | Kimura | ............... | H02M 3/3376 363/21.09 |
| 2015/0102765 A1* | 4/2015 | Lee | ........................ | H02M 1/34 320/107 |
| 2015/0194900 A1* | 7/2015 | Zheng | ............... | H02M 3/33592 363/17 |

\* cited by examiner

DC-DC CONVERTER WITH SNUBBER CIRCUIT

CROSS-REFERENCE TO RELATED APPLICATION

The present application claims priority to Korean Patent Application No. 10-2017-0135088, filed on Oct. 18, 2017, the entire contents of which is incorporated herein for all purposes by this reference.

BACKGROUND OF THE INVENTION

Field of the Invention

The present invention relates to a DC-DC converter, and more particularly, to a phase-shift full-bridge-type DC-DC converter adopting a snubber circuit configured for improving response performance.

Description of Related Art

A snubber circuit is used to suppress the transient voltage that may occur when power is supplied to an inductance load while being switched on or off. For example, the snubber circuit is applied to a phase-shift full-bridge-type DC-DC converter which is widely used in high-power applications. Since a phase-shift full-bridge-type DC-DC converter applied to an on-board charger (OBC) provided inside an environmentally friendly vehicle has a relatively low step-up/down voltage ratio, leakage inductance on the secondary side of a transformer becomes high. Therefore, a surge voltage may be generated in the component due to the resonance phenomenon occurring in the leakage inductance of the transformer and the parasitic capacitance of a rectification diode on the secondary side. Accordingly, to suppress the surge voltage applied to the device by absorbing the energy due to the resonance phenomenon, such a snubber circuit is applied.

Among the snubber circuits, a CDD snubber comprised of two diodes and one capacitor can reduce loss and can realize relatively high efficiency using the charge/discharge of the capacitor without dissipating energy into heat, unlike a snubber applied with resistors.

However, it is difficult for the CDD snubber to control the current for selecting a response band and securing the control performance in a current powering period by switching-on/off of a full-bridge switching circuit. For example, in the case of general current control, a low-pass filter having a low-pass band is applied to remove the ripple of a switching frequency from a detected signal obtained by detecting the output current of the converter. In the instant case, there is a limit in the extent to which the response performance can be improved, which may cause problems such as deterioration of control performance and occurrence of harmonic ripple.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a phase-shift full-bridge-type DC-DC converter having a snubber circuit configured for improving the response performance so that control performance is improved and the harmonic ripple is reduced.

Various aspects of the present invention are directed to providing a DC-DC converter including: an inductor configured to have one end portion connected to an input terminal and the other end portion connected to an output terminal; a switching circuit configured to determine whether or not power is to be applied from the input terminal to the inductor; a snubber circuit configured to be connected to both ends of the inductor and to the output terminal; an output current controller configured to derive an inductor current command value, which is the magnitude of current flowing through the inductor, to allow an output current detection value obtained by detecting the current supplied to the output terminal to follow a predetermined output current command value; and an inductor current controller configured to determine switching duty of the switching circuit to allow an inductor current detection value obtained by detecting a current flowing through the inductor to follow the inductor current command value.

In an exemplary embodiment of the present invention, the snubber circuit may include: a capacitor configured to have one end connected to one end of the inductor; a first diode configured to have an anode connected to the other end of the capacitor and a cathode connected to the other end of the inductor; and a second diode configured to have a cathode connected to the other end of the capacitor and an anode connected to the output terminal.

In an exemplary embodiment of the present invention, the output current controller may include a low-pass filter for filtering the output current detection value, and may generate the inductor current command value such that the output current detection value filtered by the low-pass filter follows the output current command value.

In an exemplary embodiment of the present invention, the DC-DC converter may further include: a first current detector configured to be directly disposed at the output terminal to generate the output current detection value by detecting the current flowing through the output terminal; and a second current detector configured to be directly disposed at one of the two ends of the inductor to generate the inductor current detection value by detecting the current flowing through the inductor, wherein the output current detection value generated by the first current detector is provided to the low-pass filter of the output current controller, and the inductor current detection value generated by the second current detector is provided to the inductor current controller.

In an exemplary embodiment of the present invention, the second current detector may sense a current flowing through the inductor at a time in a period in which power is applied from the input terminal or at a time in a period in which power is not applied from the input terminal by a switch of the switching circuit.

In an exemplary embodiment of the present invention, the DC-DC converter may further include a current detector configured to be directly disposed at the output terminal to generate the output current detection value by detecting the current flowing through the output terminal, wherein the output current detection value generated by the first current detector is provided to the low-pass filter of the output current controller and the inductor current controller, and wherein the inductor current controller may perform control using, as the inductor current detection value, a value corresponding to a time in a period in which power is not applied from the input terminal by a switch of the switching circuit among the output current detection values provided by the first current detector.

In an exemplary embodiment of the present invention, the switching circuit may include a transformer and a full-bridge switching circuit provided between a primary coil of the transformer and the input terminal, and a secondary coil of the transformer may be connected to one end of the inductor.

In an exemplary embodiment of the present invention, the switching circuit may further include a rectification circuit configured to be connected to both ends of the secondary coil of the transformer.

In an exemplary embodiment of the present invention, whether or not power is to be applied to the inductor from the input terminal is determined by control of switching duty of the full-bridge switching circuit.

In an exemplary embodiment of the present invention, the switching circuit may include a switching device configured to electrically connect/disconnect the input terminal and one end of the inductor.

According to another exemplary embodiment to solve the problems above, various aspects of the present invention are directed to providing a DC-DC converter including: an inductor configured to have one end connected to an input terminal and the other end connected to an output terminal; a snubber circuit configured to directly supply current to the output terminal when power is applied from the input terminal to the one end of the inductor, and configured not to directly supply current to the output terminal when power is not applied from the input terminal to the one end of the inductor; an output current controller configured to derive an inductor current command value, which is the magnitude of the current flowing through the inductor, to allow an output current detection value obtained by detecting a current supplied to the output terminal to follow a predetermined output current command value; and an inductor current controller configured to determine the switching duty of the switching circuit to allow an inductor current detection value, obtained by detecting the current flowing through the inductor, to follow the inductor current command value.

In an exemplary embodiment of the present invention, the DC-DC converter may further include a switching circuit configured to determine whether or not power is to be applied from the input terminal to the inductor.

In an exemplary embodiment of the present invention, the switching circuit may include a transformer and a full-bridge switching circuit provided between a primary coil of the transformer and the input terminal, and a secondary coil of the transformer may be connected to the one end of the inductor.

In an exemplary embodiment of the present invention, the switching circuit may further include a rectification circuit configured to be connected to both ends of the secondary coil of the transformer.

In an exemplary embodiment of the present invention, whether or not power is to be applied to the inductor from the input terminal may be determined by control of switching duty of the full-bridge switching circuit.

In an exemplary embodiment of the present invention, the switching circuit may include a switching device configured to electrically connect/disconnect the input terminal and one end of the inductor.

In an exemplary embodiment of the present invention, the output current controller may include a low-pass filter for filtering the output current detection value, and may generate the inductor current command value such that the output current detection value filtered by the low-pass filter follows the output current command value.

In an exemplary embodiment of the present invention, the DC-DC converter may further include: a first current detector configured to be directly disposed at the output terminal to generate the output current detection value by detecting the current flowing through the output terminal; and a second current detector configured to be directly disposed at one of the two ends of the inductor to generate the inductor current detection value by detecting the current flowing through the inductor, wherein the output current detection value generated by the first current detector is provided to the low-pass filter of the output current controller, and the inductor current detection value generated by the second current detector is provided to the inductor current controller.

In an exemplary embodiment of the present invention, the second current detector may sense the current flowing through the inductor at a time in a period in which power is applied from the input terminal to the inductor or at a time in a period in which power is not applied from the input terminal to the inductor by a switch of the switching circuit.

In an exemplary embodiment of the present invention, the DC-DC converter may further include a current detector configured to be directly disposed at the output terminal to generate the output current detection value by detecting a current flowing through the output terminal, wherein the output current detection value generated by the first current detector may be provided to the low-pass filter of the output current controller and the inductor current controller, and wherein the inductor current controller may perform control using, as the inductor current detection value, a value corresponding to a time in a period in which power is not applied from the input terminal to the inductor by a switch of the switching circuit among the output current detection values provided by the first current detector.

According to the DC-DC converter described above, when the snubber circuit is applied, it is possible to control the output current of the DC-DC converter through inductor current control, which is not influenced by the snubber circuit. Therefore, it is possible to solve the problem in which when a low-pass filter is applied to eliminate noise from a value obtained by directly detecting the output current, rapid current control cannot be conducted because the response to the detected value is slow.

The methods and apparatuses of the present invention have other features and advantages which will be apparent from or are set forth in more detail in the accompanying drawings, which are incorporated herein, and the following Detailed Description, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a DC-DC converter, according to various embodiments of the present invention, will be described in more detail with reference to the accompanying drawings.

Figure 1:
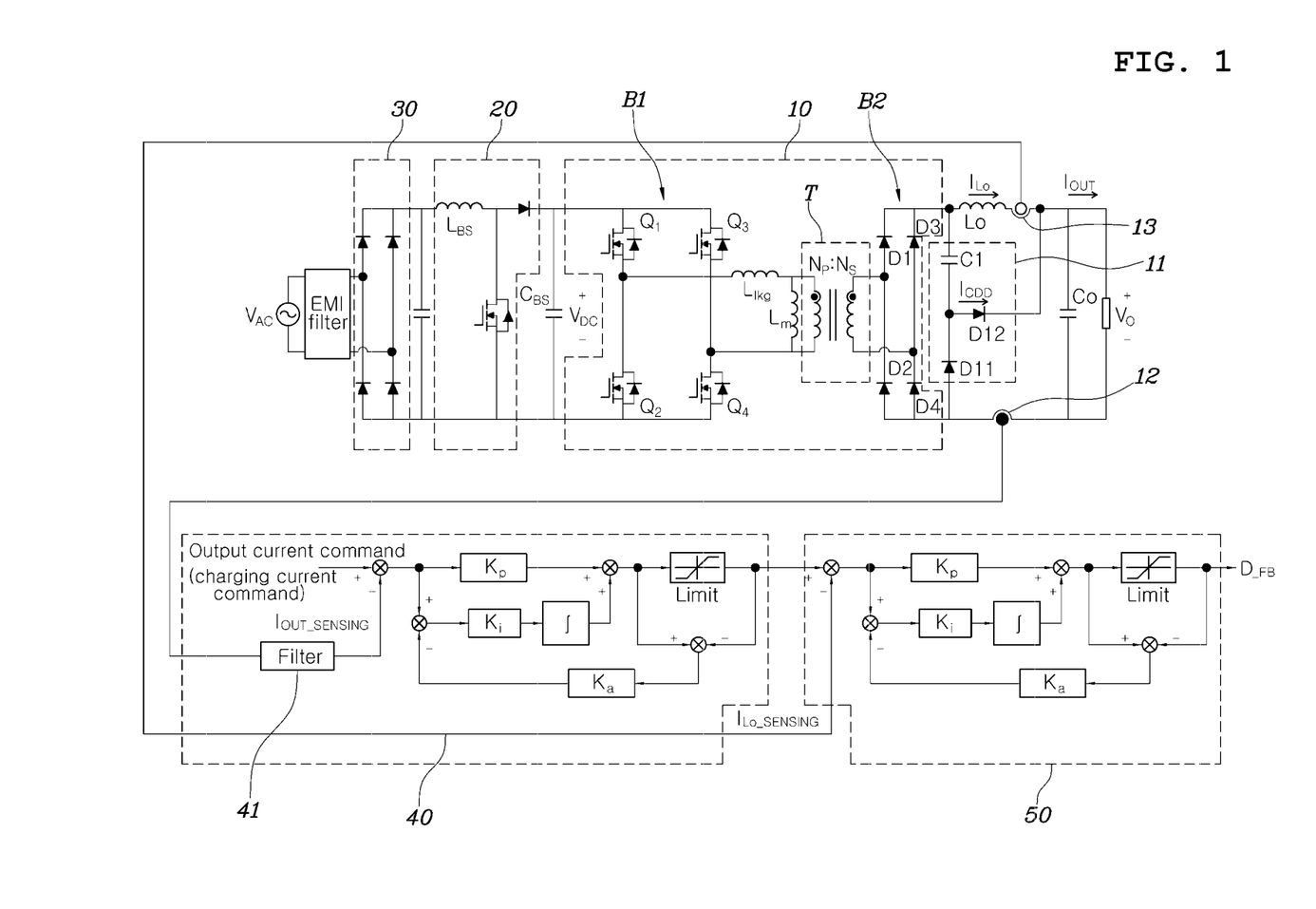
FIG. 1 is a circuit diagram of a DC-DC converter and an on-board charger including the same according to an exemplary embodiment of the present invention.

FIG. 1 is a circuit diagram of a DC-DC converter and an on-board charger including the same according to an exemplary embodiment of the present invention.

As shown in FIG. 1, a DC-DC converter, according to an exemplary embodiment of the present invention, may be applied to an on-board charger, and may be configured to include an inductor Lo having one end connected to an input terminal and the other end connected to an output terminal, a switching circuit 10 for determining whether or not power is to be applied to the inductor Lo from the input terminal, and a snubber circuit 11 connected to both ends of the inductor Lo and to the output terminal.

The on-board charger receives commercial power $V_{AC}$ and charges the battery mounted in the vehicle. The battery may be a high voltage battery that stores power used for a driving motor, which is typically used to drive the vehicle.

The on-board charger shown as an example in FIG. 1 includes an AC-DC converter 20 and 30 that converts commercial AC power to DC power and a DC-DC converter that determines the output voltage of the charger by converting the DC power output from the AC-DC converter 20 and 30 based on a variable voltage range of the battery.

Here, the AC-DC converter may include a rectification circuit 30 and a boost converter 20, which are configured with diodes.

The rectification circuit 30, which converts commercial AC voltage into DC voltage, may be configured with four rectification diodes. The boost converter 20 may be connected to an output terminal of the rectification circuit 30, and may play the role of improving a power factor by reducing reactive power. For example, a power factor correction boost converter may be used as the boost converter 20. Although the present embodiment will be described with reference to the PFC boost converter as the boost converter 20, the present invention is not limited thereto, and various types of converters may be used.

In the exemplary embodiment shown in FIG. 1, the DC-DC converter may include circuits for converting a DC voltage of a certain level input from the boost converter 20 and outputting a voltage of a level suitable for charging the battery.

In FIG. 1, the switching circuit 10 having the topology of a phase-shift full-bridge-type DC-DC converter may include a transformer T for electrical insulation between the input and output terminals and a full-bridge switching circuit B1 comprised of switching devices $Q_1$ to $Q_4$ with a full-bridge structure on the primary side of the transformer T.

The switching circuit 10, according to an exemplary embodiment of the present invention, may include a transformer T and a full-bridge switching circuit B1 provided in the primary coil of the transformer T. The secondary coil of the transformer T is connected to one end of the inductor Lo.

The full-bridge switching circuit B1 of the switching circuit 10 includes a plurality of switching devices $Q_1$ to $Q_4$. The switching devices $Q_1$ to $Q_4$ may be connected to the input terminal of the DC-DC converter 10 and the primary coil of the transformer T in a full-bridge structure. The switching devices $Q_1$ to $Q_4$ are operated by PWM control in which on/off-timing is controlled to have a powering period, in which power is transferred from the primary side to the secondary side of the transformer T, and a free-wheeling period, in which power is not transferred from the primary side to the secondary side. That is, the switching devices $Q_1$ to $Q_4$ are controlled such that the powering period and the free-wheeling period are repeated, and the magnitude of the DC voltage conversion may be determined by adjusting the duty in the powering period.

The transformer T may be provided to insulate the input and output terminals of the DC-DC converter 10 from each other, and may be implemented as a gap transformer to improve a zero voltage switching (ZVS) effect.

The switching circuit 10, according to an exemplary embodiment of the present invention, may further include a full-bridge rectification circuit B2 connected to the secondary coil of the transformer T. The rectification circuit B2 may include a plurality of diodes D1 to D4. An anode of the first diode D1 and a cathode of the second diode D2 may be connected to one end of the secondary coil of the transformer T. A cathode and an anode of the third diode D3 may be connected to a cathode of the first diode D1 and the other end of the secondary coil of the transformer T, respectively, and an anode and a cathode of the fourth diode D4 may be connected to an anode of the second diode D2 and the other end of the secondary coil of the transformer T, respectively.

In addition to the switching circuit 10, the DC-DC converter, according to an exemplary embodiment of the present invention, may include: a capacitor Co connected in parallel to the output terminal; a snubber circuit 11 provided between the secondary coil of the transformer T and the output terminal; an output current controller 40 for deriving an inductor current command value to allow an output current detection value, obtained by detecting a current $I_{OUT}$ provided to the output terminal, to follow a predetermined output current command value; and an inductor current controller 50 for determining switching duty of the switching circuit such that an inductor current detection value $I_{Lo}$, obtained by detecting the current flowing through the inductor Lo, to follow the inductor current command value.

The snubber circuit 11 may be provided between the rectification circuit and the output terminal to suppress a surge voltage that may be applied to the output terminal from the rectification circuit. The snubber circuit 11 may be comprised of one capacitor C1 and two diodes D11 and D12.

The inductor Lo and the capacitor Co is configured as a kind of filter provided to stabilize, and thus make constant, the voltage applied to the output terminal.

That is, the second filter 39 plays the role of maintaining the voltage applied to the battery (Batt) constant.

Meanwhile, the embodiment shown in FIG. 1 may include a first current detector 12 directly disposed at the output terminal to sense the current flowing through the output terminal and a second current detector 13 directly disposed at one of the two ends of the inductor Lo to sense the current flowing through the inductor Lo. The first current detector 12 may sense the magnitude of the current supplied to the output terminal, and may generate an output current detection value corresponding thereto. The second current detector 13 may sense the magnitude of the current flowing through the inductor, and may generate an inductor current detection value corresponding thereto.

The output current controller 40 derives the magnitude of an inductor current to allow an output current detection value generated by the first current detector 12 to follow a predetermined output current command value. The output current controller 40 may include a low-pass filter 41 having a low-pass band to eliminate a high-frequency noise component including ripple included in the output current detection value. As described above, in the case where the low-pass filter 41 is adopted, the response performance deteriorates. Thus, the present invention adopts an inductor current controller 50, which will be described below.

The inductor current controller 50 may determine the switching duty $D_{FB}$ of the switching circuit 10 such that an inductor current detection value, which is output from the second current detector 13, follows an inductor current command value using, as the inductor current command value, the magnitude of an inductor current derived by the output current controller 40 to allow the output current detection value to follow a predetermined output current command value. In the exemplary embodiment shown in FIG. 1, the switching duty $D_{FB}$ of the switching circuit 10 is directed to determine the duration of a period (i.e., powering duty) in which power is applied to the secondary coil of the transformer T to control the current supplied to the output terminal (that is, the duration of a period in which power is applied from the secondary coil to the inductor Lo). That is, in the exemplary embodiment shown in FIG. 1, the switching duty, determined by the inductor current controller 50, may be the switching duty of a plurality of switching devices $Q_1$ to $Q_4$ provided in the full-bridge switching circuit B1 in the switching circuit 10. Furthermore, a powering period, in which power is applied from the secondary coil to the inductor Lo, and a non-powering period, in which the power is not applied, may be determined by controlling the switching duty of the plurality of switching devices $Q_1$ to $Q_4$ provided in the full-bridge switching circuit B1.

Although the output current controller 40 and the inductor current controller 50 are illustrated as being implemented as typical PI controllers in FIG. 1, the This is merely an example, and the output current controller 40 and the inductor current controller 50 can be implemented as controllers configured for performing various control schemes including PID control, as well as PI control.

Figure 2:
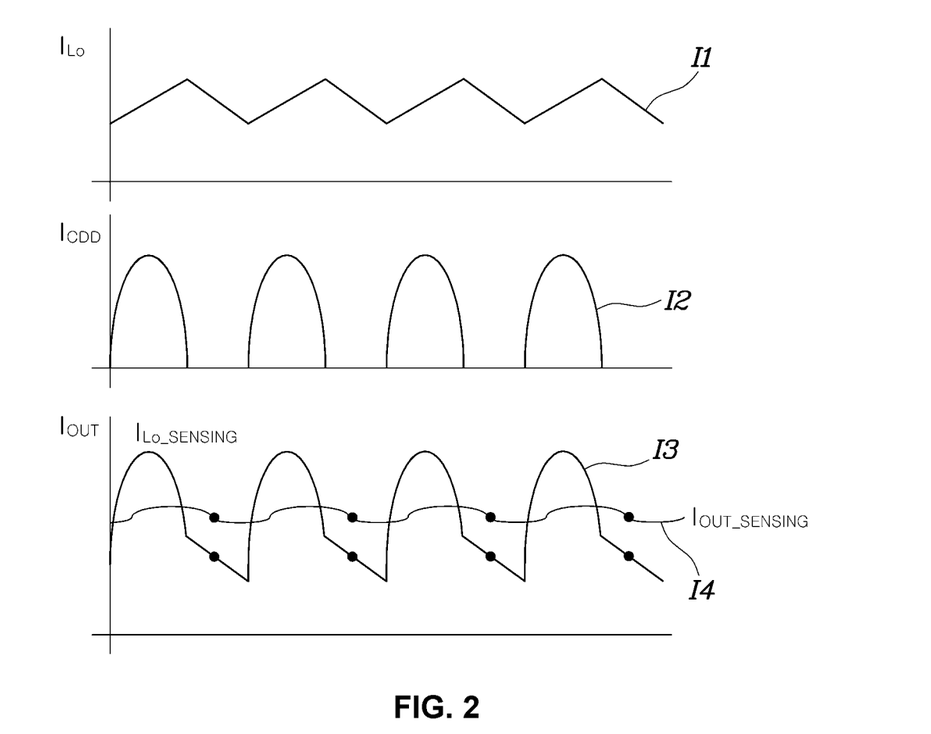
FIG. 2 is a view showing current flowing through various points on a circuit of a DC-DC converter according to an exemplary embodiment of the present invention.

FIG. 2 is a view showing current flowing through various points on a circuit of a DC-DC converter according to an exemplary embodiment of the present invention.

In FIG. 2, 'I1' denotes an inductor current, and 'I2' denotes a current which is supplied from the snubber circuit 11 to the output terminal (hereinafter, referred to as a snubber current, which is indicated by $I_{CCD}$ in FIG. 1). 'I3' denotes the current supplied to the output terminal, and 'I4' denotes a signal obtained by low-pass filtering the current supplied to the output terminal.

Referring to FIG. 2, the inductor current I1 rises in a period in which power is applied to the secondary coil of the transformer T and decreases in a period in which power is not applied to the secondary coil of the transformer T by the control of the switching devices $Q_1$ to $Q_4$ of the full-bridge switching circuit B1 in the switching circuit 10.

Furthermore, the snubber current I2 is characterized in that it is generated by discharge of the capacitor C1 in a period in which power is applied to the secondary coil of the transformer T and in that it is not generated, due to charging of the capacitor C1, in a period in which power is not applied to the secondary coil of the transformer T by the control of the switching devices $Q_1$ to $Q_4$.

Furthermore, the output current I3 equals the sum of the inductor current I1 and the snubber current I2. When the output current I3 is low-pass filtered, a signal I4 having a waveform obtained by flattening the output current I3 to some extent is generated.

As shown in FIG. 2, the inductor current rises in a period in which power is applied to the secondary coil of the transformer T, and on the other hand, the inductor current decreases in a period in which power is not applied to the secondary coil of the transformer T by control of the switching circuit. Therefore, a value representing the inductor current (i.e., a median value of the inductor current) may be obtained by detecting the current at the center of the rising period or at the center of the decreasing period.

As described above, if the current is detected by the second current detector 13 at the center of the rising or decreasing period of the inductor current, a low-pass filter is not required.

On the other hand, the output current supplied to the output terminal equals the sum of the inductor current and the snubber current. Since the waveform of the snubber current varies depending on the required voltage, the low-pass filter may be used to accurately sense the output current.

In an exemplary embodiment of the present invention, the inductor current controller 50 may determine the switching duty $D_{FB}$ of the switching circuit such that an inductor current detection value output from the second current detector 13 follows an inductor current command value using, as the inductor current command value, the magnitude of the inductor current for control performed by the output current controller 40 such that an output current detection value, which has been low-pass filtered, follows the predetermined output current command value. Therefore, it is possible to control the output current based on the inductor current detection value without applying the low-pass filter, remarkably improving the response performance of the output current control.

Figure 3:
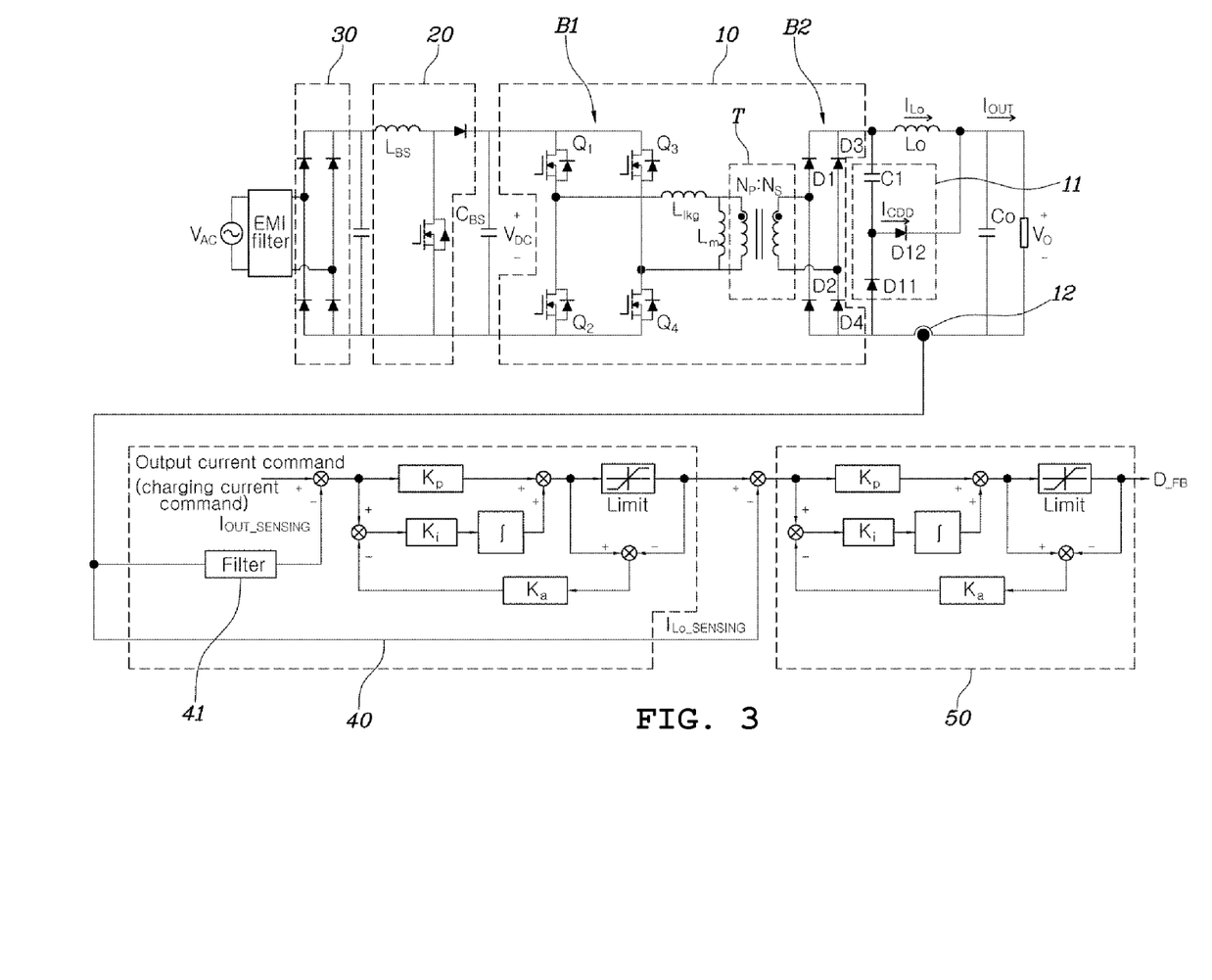
FIG. 3 is a circuit diagram of a DC-DC converter and an on-board charger including the same according to another exemplary embodiment of the present invention.

FIG. 3 is a circuit diagram of a DC-DC converter and an on-board charger including the same according to another exemplary embodiment of the present invention.

The embodiment shown in FIG. 3 is substantially the same as the embodiment shown in FIG. 1, except that the second current detector has been omitted.

The embodiment of FIG. 3 takes into account the type of current supplied to the output terminal of the DC-DC converter as shown in FIG. 2. That is, the current I3 supplied to the output terminal of the DC-DC converter equals the sum of the inductor current I1 and the snubber current I2. Here, since the snubber current I2 is not generated when power is not supplied to the secondary coil of the transformer T (that is, when power is applied to the inductor Lo), the current in a period in which power is not applied to the secondary coil of the transformer T, among the magnitudes of current supplied to the output terminal of the DC-DC converter, may equal the inductor current I1.

Therefore, in the exemplary embodiment shown in FIG. 3, an output current provided by the first current detector 12 is supplied to the output current controller 40 and the inductor current controller 50 while excluding the second current detector shown in FIG. 1. Here, the inductor current controller 50 may control the inductor current using, as an inductor current detection value, a value corresponding to a time (for example, the middle time) in a period in which power is not applied to the secondary coil of the transformer T by a switch of the switching circuit, among the output current detection values provided by the first current detector 12. The point on the graph 'I3' in FIG. 2 indicates the usage time of the inductor current detection value, which is applied to the inductor current controller 50.

As described above, since the second current detector can be omitted in the exemplary embodiment shown in FIG. 3, it is possible to reduce manufacturing costs compared with the embodiment of FIG. 1.

Figure 4:
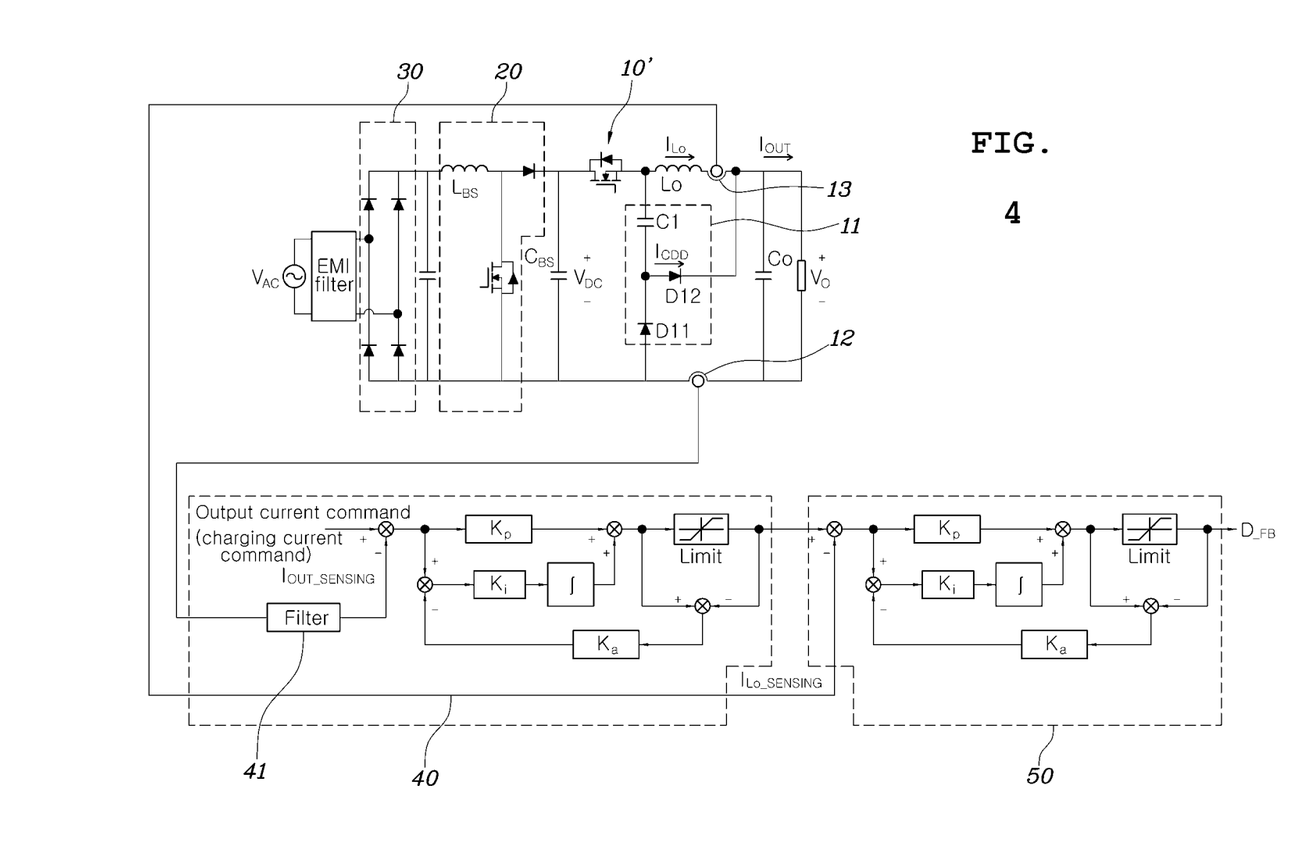
FIG. 4 and FIG. 5 are circuit diagrams of a DC-DC converter and an on-board charger including the same according to other embodiments of the present invention.
Figure 5:
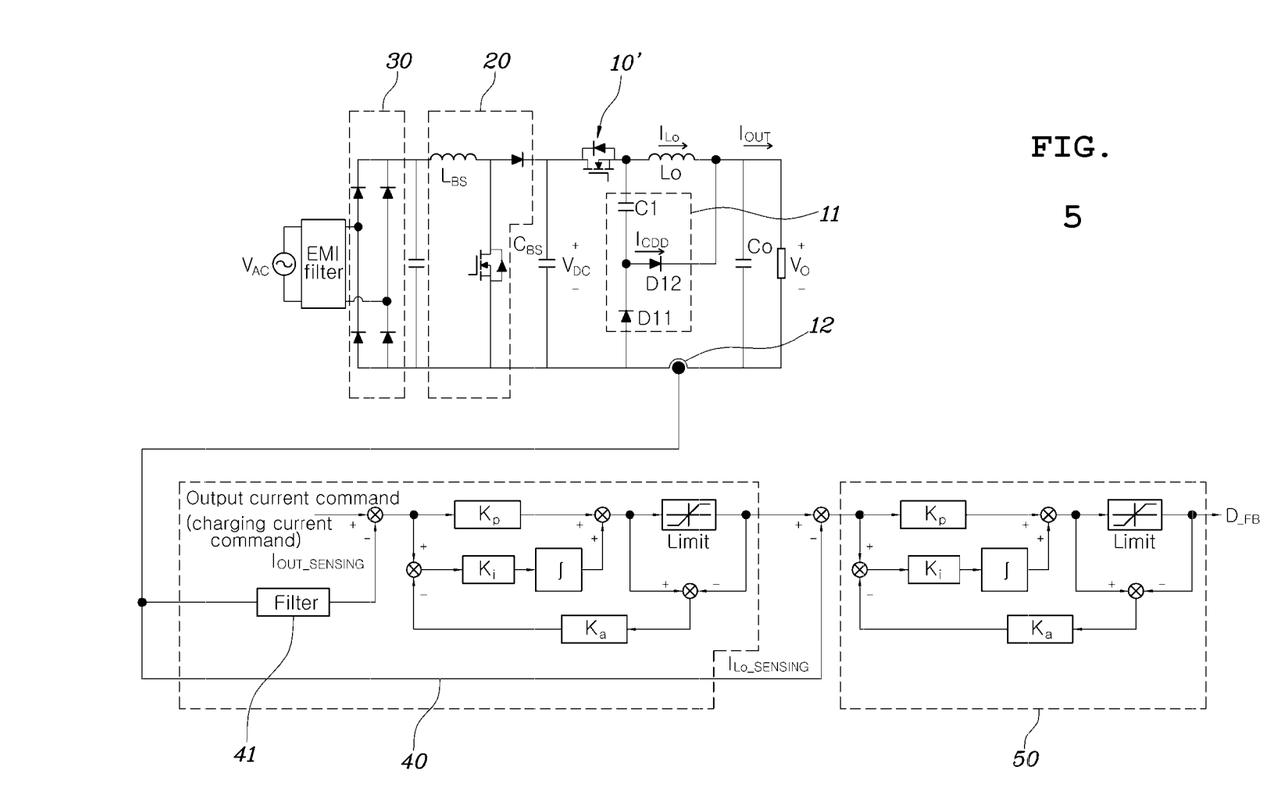

FIG. 4 and FIG. 5 are circuit diagrams of a DC-DC converter and an on-board charger including the same according to other embodiments of the present invention.

In the exemplary embodiments of FIG. 4 and FIG. 5, the switching circuit 10, which is implemented to have the topology of a phase-shift full-bridge-type DC-DC converter in the exemplary embodiments of FIGS. 1 and 3, is merely replaced by a single switching device 10'.

In the exemplary embodiments of FIGS. 1 and 3, since the switching device 10 is implemented so as to have the topology of a phase-shift full-bridge-type DC-DC converter, it is possible to insulate the input and output terminals, to adjust the magnitude of step-up/down in the voltage depending on a turns ratio of the transformer, and to determine a powering period and a non-powering period with respect to the inductor Lo by controlling the duty of the full-bridge switching circuit provided on the primary side of the transformer.

On the other hand, the exemplary embodiments of FIG. 4 and FIG. 5 have a structure in which the boost converter 20 and the output terminal are simply connected through the switching device 10'. In the present structure, the magnitude of step-up may be determined by the boost converter 20 in front of the switching device 10', and the inductor current controller 50 may determine the period in which power is applied to the inductor Lo and the period in which power is not applied to the inductor Lo by controlling the on/off duty of the switching device 10'.

It will be easily understood by those skilled in the art that the control method of a DC-DC converter, which has been described with reference to FIG. 1, FIG. 2, and FIG. 3, can also be applied to the exemplary embodiments shown in FIG. 4 and FIG. 5, except that the control target for determining the powering period is different. Therefore, an additional description of the exemplary embodiments shown in FIG. 4 and FIG. 5 will be omitted because it is the same as the description of the exemplary embodiments in FIG. 1, FIG. 2, and FIG. 3.

As described above, the DC-DC converter, according to various embodiments of the present invention, can control the output current thereof through current control of the inductor, which is not affected by the snubber circuit. That is, it is possible to solve the problem including reduction in the response performance of a detection value by low-pass filtering, which occurs in the related art in which the low-pass filter is applied to eliminate noise in the value obtained by directly detecting the output current and the output current of the DC-DC converter is directly controlled based on the low-pass-filtered detection value.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A DC-DC converter comprising:
    an inductor configured to have a first end connected to an input terminal and a second end connected to an output terminal;
    a switching circuit configured to determine whether power is to be applied from the input terminal to the inductor;
    a snubber circuit configured to be connected to the first end and the second end of the inductor and to the output terminal;
    an output current controller configured to derive an inductor current command value, which is a magnitude of a current flowing through the inductor, to allow an output current detection value obtained by detecting a current supplied to the output terminal to follow a predetermined output current command value; and
    an inductor current controller configured to determine switching duty of the switching circuit to allow an inductor current detection value, obtained by detecting the current flowing through the inductor, to follow the inductor current command value.

2. The DC-DC converter of claim 1, wherein the snubber circuit includes:
    a capacitor configured to have a first end connected to the first end of the inductor;
    a first diode configured to have an anode connected to a second end of the capacitor and a cathode connected to the second end of the inductor; and
    a second diode configured to have a cathode connected to the second end of the capacitor and an anode connected to the output terminal.

3. The DC-DC converter of claim 1, wherein the output current controller includes a low-pass filter for filtering the output current detection value and generates the inductor current command value, and wherein the output current detection value filtered by the low-pass filter follows the output current command value.

4. The DC-DC converter of claim 3, further including:
    a first current detector configured to be directly disposed at the output terminal to generate the output current detection value by detecting the current supplied to the output terminal; and
    a second current detector configured to be directly disposed at one of the first and second ends of the inductor to generate the inductor current detection value by detecting the current flowing through the inductor,
    wherein the output current detection value generated by the first current detector is provided to the low-pass filter of the output current controller, and the inductor current detection value generated by the second current detector is provided to the inductor current controller.

5. The DC-DC converter of claim 4, wherein the second current detector is configured to detect the current flowing through the inductor at a time in a period in which power is applied from the input terminal or at a time in a period in which power is not applied from the input terminal by a switch of the switching circuit.

6. The DC-DC converter of claim 3, further including a first current detector configured to be directly disposed at the output terminal to generate the output current detection value by detecting the current supplied to the output terminal,
   wherein the output current detection value generated by the first current detector is provided to the low-pass filter of the output current controller and the inductor current controller, and
   wherein the inductor current controller is configured to perform control using, as the inductor current detection value, a value detected by the first current detector at a time in a period in which power is not applied from the input terminal by a switch of the switching circuit.

7. The DC-DC converter of claim 1, wherein the switching circuit includes a transformer and a full-bridge switching circuit provided between a primary coil of the transformer and the input terminal, and
   wherein a secondary coil of the transformer is connected to the first end or the second end of the inductor.

8. The DC-DC converter of claim 7, wherein the switching circuit further includes a rectification circuit configured to be connected to a first end and a second end of the secondary coil of the transformer.

9. The DC-DC converter of claim 7, wherein whether power is applied to the inductor from the input terminal is determined by control of the switching duty of the full-bridge switching circuit.

10. The DC-DC converter of claim 1, wherein the switching circuit includes a switching device configured to electrically connect or disconnect the input terminal and the first end or the second end of the inductor.

11. A DC-DC converter comprising:
   an inductor configured to have a first end connected to an input terminal and a second end connected to an output terminal;
   a snubber circuit configured to directly supply current to the output terminal when power is applied from the input terminal to the first end of the inductor, and configured not to directly supply current to the output terminal when power is not applied from the input terminal to the first end of the inductor;
   an output current controller configured to derive an inductor current command value, which is a magnitude of a current flowing through the inductor, to allow an output current detection value, obtained by detecting a current supplied to the output terminal, to follow a predetermined output current command value; and
   an inductor current controller configured to determine switching duty of a switching circuit to allow an inductor current detection value obtained by detecting the current flowing through the inductor to follow the inductor current command value.

12. The DC-DC converter of claim 11, wherein the switching circuit determines whether power is applied from the input terminal to the inductor.

13. The DC-DC converter of claim 12, wherein the switching circuit includes a transformer and a full-bridge switching circuit provided between a primary coil of the transformer and the input terminal, and
   wherein a secondary coil of the transformer is connected to the first end of the inductor.

14. The DC-DC converter of claim 13, wherein the switching circuit further includes a rectification circuit configured to be connected to a first end and a second end of the secondary coil of the transformer.

15. The DC-DC converter of claim 13, wherein whether power is applied to the inductor from the input terminal is determined by control of the switching duty of the full-bridge switching circuit.

16. The DC-DC converter of claim 12, wherein the switching circuit includes a switching device configured to electrically connect or disconnect the input terminal and the first end or the second end of the inductor.

17. The DC-DC converter of claim 11, wherein the output current controller includes a low-pass filter for filtering the output current detection value and generates the inductor current command value, and wherein the output current detection value filtered by the low-pass filter follows the output current command value.

18. The DC-DC converter of claim 17, further including:
   a first current detector configured to be directly disposed at the output terminal to generate the output current detection value by detecting the current supplied to the output terminal; and
   a second current detector configured to be directly disposed at one of the first end and the second end of the inductor to generate the inductor current detection value by detecting the current flowing through the inductor,
   wherein the output current detection value generated by the first current detector is provided to the low-pass filter of the output current controller and the inductor current detection value generated by the second current detector is provided to the inductor current controller.

19. The DC-DC converter of claim 18, wherein the second current detector is configured to detect the current flowing through the inductor at a time in a period in which power is applied from the input terminal to the inductor or at a time in a period in which power is not applied from the input terminal to the inductor by a switch of the switching circuit.

20. The DC-DC converter of claim 17, further including a first current detector configured to be directly disposed at the output terminal to generate the output current detection value by detecting the current supplied to the output terminal,
   wherein the output current detection value generated by the first current detector is provided to the low-pass filter of the output current controller and the inductor current controller, and
   wherein the inductor current controller is configured to perform control using, as the inductor current detection value, a value detected by the first current detector at a time in a period in which power is not applied from the input terminal to the inductor by a switch of the switching circuit.

* * * * *